US012623592B1

(12) United States Patent
Kim et al.

(10) Patent No.: US 12,623,592 B1
(45) Date of Patent: May 12, 2026

(54) INDIRECT LIGHTING WITH LIGHT GUIDE FOR VEHICLE ROOM

(71) Applicant: ECOPLASTIC CORPORATION, Gyeongju-si (KR)

(72) Inventors: Eung Joo Kim, Gyeongju-si (KR); Seong Gil Jeong, Ulsan (KR); Hyun Cheol Jang, Gyeongju-si (KR)

(73) Assignee: ECOPLASTIC CORPORATION, Gyeongju-si (KR)

( * ) Notice: Subject to any disclaimer, the term of this patent is extended or adjusted under 35 U.S.C. 154(b) by 0 days.

(21) Appl. No.: 19/082,565

(22) Filed: Mar. 18, 2025

(30) Foreign Application Priority Data

Dec. 31, 2024 (KR) ........................ 10-2024-0202286

(51) Int. Cl.
　B60Q 3/62 (2017.01)
　B60Q 3/70 (2017.01)
　F21V 8/00 (2006.01)
(52) U.S. Cl.
　CPC ................. B60Q 3/62 (2017.02); B60Q 3/70 (2017.02); G02B 6/0021 (2013.01); G02B 6/0043 (2013.01)
(58) Field of Classification Search
　CPC .......... B60Q 3/62; B60Q 3/70; G02B 6/0021; G02B 6/0043
　USPC ........................................ 362/511, 551, 581
　See application file for complete search history.

(56) References Cited

U.S. PATENT DOCUMENTS

| | | | |
|---|---|---|---|
| 9,533,615 B2 | 1/2017 | Moberg et al. | |
| 2009/0237954 A1* | 9/2009 | Goto ..................... | G02B 6/0006 362/551 |
| 2012/0163017 A1* | 6/2012 | Liu .......................... | G02B 6/10 362/581 |
| 2023/0099347 A1 | 3/2023 | Matsumura et al. | |

FOREIGN PATENT DOCUMENTS

| | | |
|---|---|---|
| DE | 10031527 A1 | 1/2002 |
| DE | 10135478 A1 | 4/2003 |
| DE | 102019001330 A1 | 8/2020 |
| EP | 2676841 A1 | 12/2013 |
| FR | 2872750 A3 | 1/2006 |

(Continued)

OTHER PUBLICATIONS

EESR for EP application No. 25162927.5, dated Jun. 10, 2025, 32 pages.

(Continued)

*Primary Examiner* — Thomas M Sember
(74) *Attorney, Agent, or Firm* — Tarolli, Sundheim, Covell & Tummino LLP

(57) ABSTRACT

Disclosed is an indirect lighting with a light guide for a vehicle room, including: a light source; a light guide transferring light from the light source; a housing accommodating the light guide therein and mounted on a vehicle internal structure; and a slit formed in the vehicle internal structure, and at least a portion of the light guide may be inserted into the slit to be exposed to an outside, and the exposed portion may be disposed to be headed to a front surface of the vehicle internal structure such that light from the light source is reflected therefrom. Therefore, there is an effect of reducing the manufacturing cost as the quantity of parts is reduced by integrally designing the lens and the light guide.

3 Claims, 1 Drawing Sheet

(56)     References Cited

FOREIGN PATENT DOCUMENTS

| JP | 2013244894 | A | 12/2013 |
| JP | 2015098260 | A | 5/2015 |
| JP | 2019194036 | A | 11/2019 |
| JP | 2022063640 | A | 4/2022 |
| KR | 101983722 | B1 | 6/2019 |

OTHER PUBLICATIONS

Office Action for KR application No. 10-2024-0202286, dated Feb. 26, 2026, 5 pages.

* cited by examiner

[FIG. 1]
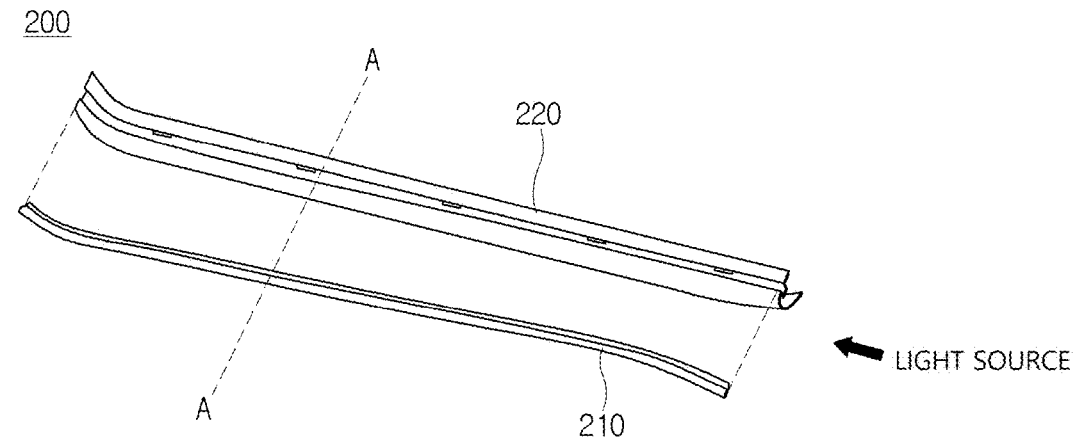
[FIG. 2]
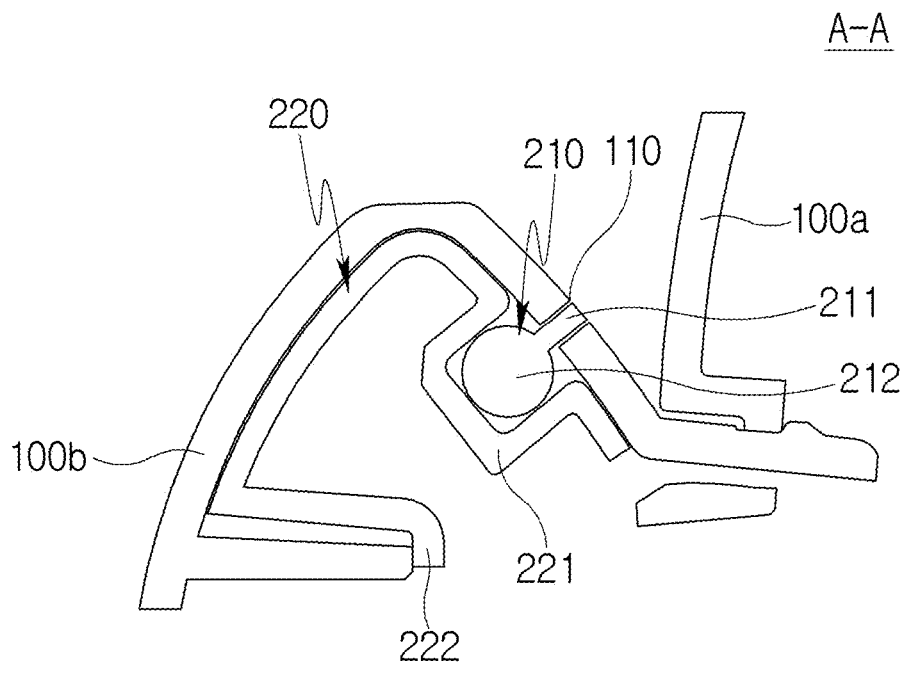

INDIRECT LIGHTING WITH LIGHT GUIDE FOR VEHICLE ROOM

CROSS REFERENCE TO RELATED APPLICATION

The present application claims priority to Korea Patent Application No. 10-2024-0202286, filed Dec. 31, 2024, the entire contents of which is incorporated herein for all purposes by this reference.

FIELD

The present disclosure relates to an indirect lighting with a light guide for a vehicle room, more particularly, to an indirect lighting with a light guide for a vehicle room configured to transfer light to a vehicle internal structure using a light guide having a free cross-section and to provide a lighting effect.

BACKGROUND

Inside a vehicle, various kinds of lightings are installed to serve to satisfy the emotion of the user. These lightings are referred to as mood lamps in general.

As application of the mood lamp in an interior of a vehicle increases, a quantity of parts and manufacturing expenses increase. The existing mood lamp configuration has a problem in that the lamp consists of many parts, therefore, assembling steps are complex and expenses increase. In order to solve the problem, it is necessary to develop a new technology capable of reducing the quantity of parts and simplifying a manufacturing process.

The existing technology had a limitation in that increased quantity of parts led to cost increase, assembly of many parts led the production efficiency to deteriorate, and a fixed shape of the light guide led a creative design to be limited.

Meanwhile, as the prior art, Korea Patent No. 10-2684862 is cited. This patent discloses a mood lamp system for improving aesthetics and implementing various colors and patterns in the lightings inside and outside a vehicle.

However, the prior art has a problem in that a manufacturing process is complex due to many components such as a film layer and a distribution layer, etc. In addition, because of this, the manufacturing cost increases.

Furthermore, the prior art has a problem in that there is a limitation in implementing various colors and patterns because the shapes of the film layer and the distribution layer are limited.

PRIOR ART DOCUMENT

Patent Document (Patent Document 1) Korea Patent No. 10-2684862

SUMMARY

The present disclosure is conceived from the above-described background, and an object of the present disclosure is to provide a light guide technology having a free cross-section capable of cutting the manufacturing cost and simplifying an assembly process of the mood lamp for an indirect lighting inside a vehicle.

In particular, an object of the present disclosure is to provide a mood lamp capable of securing convenience and accuracy in the assembly process by designing a lens and a light guide to be integrated with each other so as to reduce the quantity of parts, and by allowing various shapes and patterns to be implemented through a free cross-section design.

The objects of the present disclosure are not limited to the above-mentioned objects, and other objects that are not mentioned will be clearly understood by ordinary-skilled persons in the art to which the present disclosure pertains from the following description.

One embodiment is an indirect lighting with a light guide for a vehicle room, including: a light source; a light guide transferring light from the light source; a housing accommodating the light guide therein and mounted on a vehicle internal structure; and a slit formed in the vehicle internal structure, and at least a portion of the light guide may be inserted into the slit to be exposed to an outside, and the exposed portion may be disposed to be headed to a front surface of the vehicle internal structure such that light from the light source is reflected therefrom.

Meanwhile, the light guide may include: a body having a circular cross-section; and a protrusion protruding from the body and having a quadrangular cross-section, and the protrusion may be inserted into and be coupled to the slit.

In addition, in the protrusion, light diffusion treatment may be performed on the portion thereof exposed to an outside.

Meanwhile, the vehicle internal structure may include: an upper structure; and a lower structure coupled to a lower portion of the upper structure, and the light guide may be accommodated in the lower structure, and the slit may be opened upward so that light is emitted toward the upper structure.

Alternatively, the vehicle internal structure may include: an upper structure; and a lower structure coupled to a lower portion of the upper structure, and the light guide may be accommodated in the upper structure, and the slit may be opened downward so that light is emitted toward the lower structure.

Meanwhile, at least some portion of the upper structure may include a surface facing the lower structure.

According to the present disclosure, by designing the light guide lens and the light guide to be integrated with each other, there is an effect of reducing the manufacturing cost due to reduced quantity of parts.

In addition, there are effects of improving aesthetics because various shapes and patterns can be implemented through a free cross-section design and of providing flexibility in the design perspective.

Moreover, there are effects of improving production efficiency and preventing quality deterioration attributable to assembly errors by simplifying the assembly process and securing accuracy in the assembly process.

BRIEF DESCRIPTION OF THE DRAWINGS

FIG. 1 is a view illustrating a housing and a light guide of an indirect lighting with a light guide for a vehicle room according to an embodiment of the present disclosure.

FIG. 2 is a cross-sectional view illustrating a cross-section of an indirect lighting with a light guide for a vehicle room according to an embodiment of the present disclosure.

DETAILED DESCRIPTION

Hereinafter, exemplary embodiments of the present disclosure will be described with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

FIG. 1 is a view illustrating a housing and a light guide of an indirect lighting with a light guide for a vehicle room according to an embodiment of the present disclosure. FIG. 2 is a cross-sectional view illustrating a cross-section of an indirect lighting with a light guide for a vehicle room according to an embodiment of the present disclosure.

As illustrated in the drawings, an indirect lighting 200 with a light guide for a vehicle room according to an embodiment of the present disclosure includes a light source, a light guide 210 configured to transfer light from the light source (not illustrated), a housing 220 accommodating the light guide 210 and mounted on a vehicle internal structure 100, and a slit 110 formed in the vehicle internal structure 100, and the light guide 210 may be formed such that at least a portion of the light guide 210 is inserted into the slit 110 to be exposed to an outside, and the exposed portion is disposed to be headed to a front surface of the vehicle internal structure 100 so that light from the light source (not illustrated) is reflected therefrom.

First, the vehicle internal structure 100 on which the indirect lighting 200 with a light guide for a vehicle room is installed will be described.

The vehicle internal structure 100 may include an upper structure 100a and a lower structure 100b. The lower structure 100b may be coupled to the upper structure 100a to form an interior of the vehicle.

When a position at which the indirect lighting 200 with the light guide for a vehicle room is disposed is a door trim, the upper structure 100a may be a garnish. In addition, the lower structure 100b may be a skin. Meanwhile, when a position at which the indirect lighting 200 with the light guide for a vehicle room is disposed is a dashboard, the upper structure 100a may be an upper panel of the dashboard. The lower structure 100b may be a lower panel of the dashboard which includes a glove box.

According to the present disclosure, the light guide 210 may be formed such that the light guide 210 is accommodated in the upper structure 100a to emit light toward the lower structure 100b. Alternatively, the light guide 210 may be formed such that the light guide 210 is accommodated in the lower structure 100b to emit light toward the upper structure 100a.

The upper structure 100a and the lower structure 100b are coupled to each other with a certain level difference, and may be formed such that at least some of the upper structure 100a looks at a front surface of the lower structure 100b. Alternatively, they may be formed such that at least some of the lower structure 100b looks at a front surface of the upper structure 100a.

The indirect lighting 200 with the light guide for a vehicle room may be inserted into the vehicle internal structure 100 and may form some of the interior inside the vehicle. The present disclosure uses an indirect lighting method which plays the role of an indirect lighting by setting a direction of emitting light to be a direction of the vehicle internal structure 100. This method provides a smooth and even lighting because light is reflected and distributed through a surface of the vehicle internal structure.

The indirect lighting 200 with the light guide for a vehicle room according to the present disclosure may include a light source (not illustrated), the light guide 210, and the housing 220.

First, the light source (not illustrated) of the indirect lighting 200 with the light guide for a vehicle room is configured with an LED, and configured to generate light and transfer the light to the light guide 210. The light source (not illustrated) is disposed in the vehicle internal structure 100, and may provide the maximum light amount using the minimum space. The light source (not illustrated) may be controllable by being connected to a PCB. The light source (not illustrated) connected to the PCB may include a control system capable of implementing various colors and brightness. The control system may be adjusted by the user to be suitable for a lighting environment. The light source (not illustrated) may be supplied with a power from an internal power supply of the vehicle.

The light guide 210 may be made of polycarbonate (PC) or polymethyl methacrylate (PMMA), which is a transparent material. The light guide 210 of the indirect lighting 200 with the light guide for a vehicle room may have a shape extending in a left-right direction. The light guide 210 may be disposed to lighten the internal space of the vehicle.

The present disclosure relates to an indirect lighting mood lamp, and the light guide 210 may have at least some portion thereof inserted into the slit 110 to be exposed to the outside, and the exposed portion may be disposed to be headed to the front surface of the vehicle internal structure 100. Accordingly, it may be formed such that the light from the light source (not illustrated) is reflected from the front surface of the vehicle internal structure 100.

The existing light guide 210 generally has a circular cross-section. However, the light guide 210 according to the present disclosure may have a free cross-section, rather than the circular cross-section. In more detail, the light guide 210 may include a body 211 having a circular cross-section and a protrusion 212 protruding from the body 211. For example, the light guide 210 may include the body 211 having a circular cross-section and the protrusion 212 protruding from the body 211 and having a quadrangular cross-section.

Therefore, the overall cross-section of the light guide 210 may be formed asymmetrically.

The asymmetrical cross-sectional structure is designed in consideration of a light transfer path and a coupling structure, and may allow coupling between the slit 110 and a housing 220 to be possible.

The body 211 means a portion accommodated in the housing 220. The body 211 may be accommodated in a recess 221 extending in a left-right direction in the housing 220. The cross-section of the body 211 may form a circular shape. The body 211 may serve to transfer light from the light source (not illustrated).

The protrusion 212 protruding from the body 211 may be inserted into the slit 110. An end of the protrusion 212 may be formed to be exposed to the outside through the slit 110. At this instance, a shape of the protrusion 212 may be formed to correspond to a shape of the slit 110. For example, when the slit 110 has two parallel surfaces, the protrusion 212 may be formed to have a quadrangular cross-section so that the protrusion 212 can be inserted into between the two surfaces. As another example, when the slit 110 has two parallel curved surfaces, the protrusion 212 may be formed to have an arc, an oval, or a curved cross-section corresponding to the curved surface.

The protrusion 212 may be disposed such that an end thereof is headed to the vehicle internal structure 100. Here, the end of the protrusion 212 may mean a tip end where light is emitted. Through the protrusion 212, it is possible to irradiate light transferred from the light source (not illustrated) to the vehicle internal structure 100.

In addition, light diffusion treatment may be performed on the end of the protrusion 212. By doing so, there is an effect of improving evenness of the light and minimizing the glare, without using a lens. The light diffusion treatment may use technologies such as fine particle coating, surface etching, or polymer diffusing film.

Meanwhile, the slit 110 may be formed in the vehicle internal structure 100. The slit 110 may serve as an opening into which the protrusion 212 of the light guide 210 is inserted.

The slit 110 may accommodate the protrusion 212 of the light guide 210. When the slit 110 is formed in the upper structure 100*a*, the light guide 210 may serve as a downward lighting. Meanwhile, when the slit 110 is formed in the lower structure 100*b*, the light guide 210 may serve as an upward lighting.

In addition, the slit 110 may be designed such that light is not leaked to the outside and is concentrated in a target region.

The housing 220 may accommodate the light guide 210 therein. In addition, the housing 220 may be mounted on the vehicle internal structure 100. The housing 220 may include the recess 221 designed to accommodate the light guide 210 therein, and a catching portion 222 for fixing to the vehicle internal structure 100.

First, the recess 221 may be formed to be opened toward the slit 110. It may be formed such that upon accommodation of the body 211 of the light guide 210 in the recess 221, the protrusion 212 is coupled to the slit 110. The recess 221 may be formed to be opened toward the vehicle internal structure 100. Accordingly, light emitted through the slit 110 may be headed to the vehicle internal structure 100.

In addition, the housing 220 may include a catching portion 222 for fixing to the vehicle internal structure 100. The catching portion 222 has a shape protruding from a lower portion of the housing 220, and may have a triangular cross-section.

The catching portion 222 may be caught by a portion of the vehicle internal structure 100 to be coupled thereto. The catching portion 222 may provide a fixing force so that a position of the housing 220 does not change due to vibration or impact on the vehicle.

According to embodiments of the present disclosure having the above-described shape and structure, there is an effect of saving the manufacturing cost because the quantity of parts is reduced, by integrally designing the light guide, without a need of a lens. In addition, there is an effect of improving aesthetics and providing flexibility in the design perspective because various shapes and patterns can be implemented through a free cross-section design. Furthermore, there is an effect of improving production efficiency and preventing quality deterioration due to an assembly error by simplifying the assembly process and securing accuracy in the assembly process.

Although elements of the present disclosure are described as being integrated into a single one or operated as a single one, the present disclosure is not necessarily limited to such forms. The elements may be selectively integrated into one or more and be operated as one or more according to the present disclosure.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical spirit of the present disclosure. The scope of the technical spirit of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

REFERENCE NUMERALS

100: vehicle internal structure
100*a*: upper structure
100*b*: lower structure
110: slit
200: indirect lighting with a light guide for a vehicle room
210: light guide
211: body
212: protrusion
220: housing
221: recess
222: catching portion

What is claimed is:

1. An indirect lighting apparatus with a light guide for a vehicle room, comprising:
    a light source;
    a light guide transferring light from the light source, the light guide including a body having a circular cross-section and a protrusion, having a quadrangular cross-section, that integrally extends from the body;
    a housing accommodating the light guide therein and configured to be mounted on a vehicle internal structure, wherein the protrusion is inserted into and is coupled to a slit provided in the vehicle internal structure,
    wherein the protrusion is inserted into the slit to be exposed to an outside, and wherein the protrusion is directed toward an upper portion of the vehicle internal structure such that light from the light source is reflected therefrom.

2. The indirect lighting apparatus with a light guide for a vehicle room of claim 1, wherein in the protrusion, light diffusion treatment is performed on the portion thereof exposed to an outside.

3. The indirect lighting apparatus with a light guide for a vehicle room of claim 1, wherein the slit has a constant cross section.

\* \* \* \* \*